May 9, 1939.  H. BUSSMEYER  2,157,321
METHOD OF AND APPARATUS FOR TREATING CEMENT RAW
MATERIAL AND SIMILAR SUBSTANCES
Filed Dec. 7, 1937
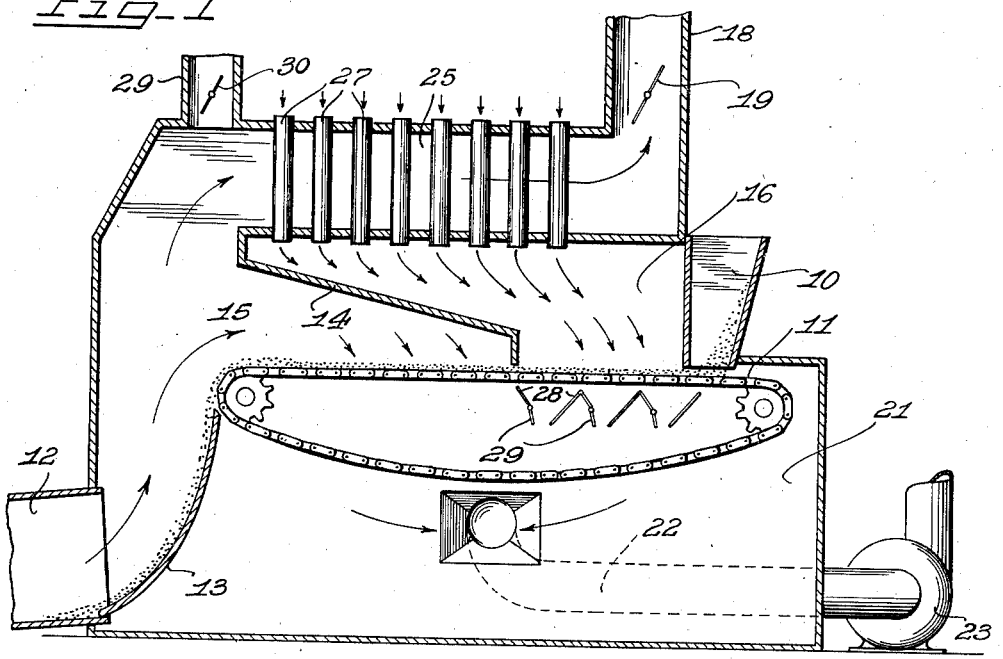
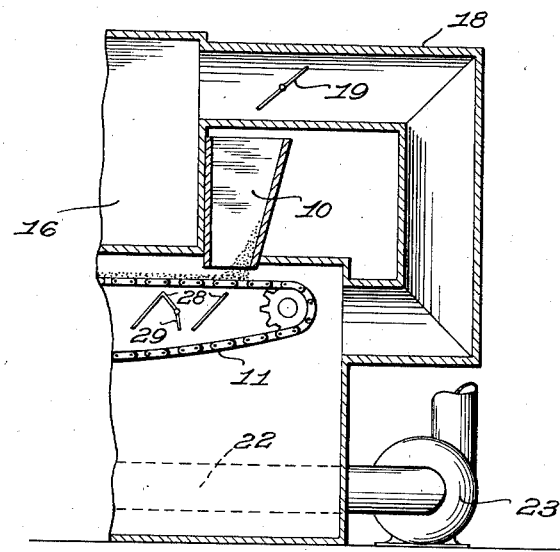
INVENTOR.
Hans Bussmeyer
BY Watson, Cait, Morse
& Grindle
ATTORNEYS.

Patented May 9, 1939

2,157,321

UNITED STATES PATENT OFFICE 2,157,321

METHOD OF AND APPARATUS FOR TREATING CEMENT RAW MATERIAL AND SIMILAR SUBSTANCES

Hans Bussmeyer, Dessau, Germany

Application December 7, 1937, Serial No. 178,582
In Germany December 9, 1936

13 Claims. (Cl. 263—53)

This invention relates to improvements in processes and apparatus for the burning, roasting, and sintering of cement raw material and of various other materials of a similar nature which are normally prepared or processed in a manner analogous to that employed in the manufacture of cement. The invention is particularly concerned with the preliminary treatment of materials of this general character, and especially cement raw material, prior to the introduction thereof into a kiln.

In the prior U. S. patents to Otto Lellep, Nos. 1,775,313 and 1,992,704, a method of processing pulverulent raw material is described, this method including the successive steps of forming the material into nodules, passing hot kiln gases downwardly through a bed of the nodulized material to dry and partially burn the same, and thereafter discharging the pretreated nodules into the kiln from which the hot gases are received, wherein the burning is completed. It is pointed out in Lellep Patent No. 1,992,704 that it is desirable to avoid the subjection of the nodules to the direct action of the extremely hot kiln gases until the moisture incorporated in the nodules in the formation thereof has been completely eliminated by gradual drying; otherwise it is found that the rapid generation of steam within the nodules causes the latter to burst and the advantages derived from the formation of the material into nodules of generally uniform size are largely sacrificed. The patentee therefore proposes to modify the apparatus illustrated in his earlier patent, which includes a moving grate on which the nodulized material is pretreated, by the provision of means which divides the space immediately above the grate into two chambers, whereby the temperature of the kiln gas in one chamber may be substantially lower than the temperature in the other chamber into which the waste gases are initially directed from the kiln. The nodules are carried by the conveyor through the two chambers in succession, passing first through that chamber in which the lower temperature is established, in which chamber the complete drying of the nodules is effected.

It has also been discovered that there are certain optimum temperatures which should be maintained in the two chambers for most efficient operation. Thus for example, in the treatment of cement raw material the temperature of the gases in the chamber adjacent the kiln will usually range from 1600° to 1800° F., while the desirable temperature range in the chamber through which the nodules are first moved is between 500° and 800° F. and preferably about 600° F., the difference in temperature of the gases in the two chambers being approximately 1000° F. The maintenance of these temperatures is important since it is thereby ensured that the nodules of cement raw material will be gradually but completely dried before subjection to the direct action of the kiln gases; the nodules in the first chamber, which may be referred to as a drying and preheating chamber, are preferably raised to a temperature equal to or approaching that of the gases within the chamber, namely 500° to 800° F., before passage of these nodules into the second or preburning or precalcining chamber. It is also advisable that the nodules should remain in the latter chamber for a sufficient length of time to effect calcination to the extent of about 20% to 30% before discharge of the material into the kiln, in order that the kiln efficiency may be increased and the use of an extremely long kiln avoided. It is found that in apparatus of the type described in the prior Lellep Patent No. 1,992,704, which employs a continuously moving grate, the area of that portion of the grate which supports the material in the drying and preheating chamber should comprise about 30% to 55% of the total effective grate area.

It is therefore one of the objects of the instant invention to provide means whereby accurate regulation and control of the temperature in the preheating chamber of apparatus of the character disclosed in the patents to Lellep can be secured. It is a feature of the invention that such control may be effected in such manner that the desired temperature may be established regardless of variation of operating conditions, such as the temperature of the hot gases as they issue from the kiln, the moisture content of the nodules, etc., which factors necessarily affect to some extent the temperature in the drying and preheating chamber when the apparatus shown in the prior Lellep patents is employed.

It is also found, in the use of this type of apparatus, that certain substances evolved in the kiln and undesirable in the finished product are carried over with the kiln gases into the preheating chamber of the Lellep apparatus and are absorbed in the moist nodules. For example, in the calcining of cement raw material in a kiln, sulphur dioxide is formed; when the kiln gases are contacted with the moist nodules, this gas is absorbed and the sulphur content of the nodules as discharged into the kiln accordingly increased. As the process is continued the sulphur in the cement material becomes more concentrated and the product of the kiln correspondingly less pure, the sulphur retarding the setting of the cement. It is therefore an object of the instant invention to overcome this difficulty and at the same time to utilize the major part of the heat in the waste kiln gases. Specifically it is proposed to eliminate the direct contact of the kiln gases with the moist nodules, the gases normally passing into the preheating chamber and through the moist material therein being diverted and passed through a heat exchange device, the heat of the kiln gas being thus utilized to raise the temperature of fresh air or other less objectionable gases to that found desirable for use in the preheating chamber, and the air or gas thus heated, rather than the waste kiln gases, is passed through the material in the preheating chamber.

Further objects and features of the invention will be apparent from the following description taken in connection with the accompanying drawing, in which Figure 1 is a longitudinal sectional view of apparatus embodying the principles of the invention; and Figure 2 is a view of a portion of the structure shown in Figure 1 illustrating a slightly modified arrangement.

In the drawing the principles of the invention are illustrated as applied to apparatus of the character disclosed in the prior patents to Lellep hereinbefore mentioned, and specific language is employed in describing this apparatus and the various modifications thereof proposed herein. It will nevertheless be appreciated that no limitation of the invention is thereby intended. Thus it is contemplated that my method of preparing raw materials of various kinds may be carried out with apparatus of a distinctly different type from that shown; the details of the illustrated type of apparatus may be modified to a considerable extent without departing from the principles of the invention. For convenience the application of the invention to the treatment of cement raw material prior to the introduction thereof into a kiln in which the final burning is effected will be explained.

In Figure 1 of the drawing are shown the material inlet end of a rotary kiln 12 and the apparatus for pre-treating the material and supplying the same to the kiln. The material, which has been previously formed into moist nodules of generally uniform size by any conventional means, is introduced in the hopper 10 and is delivered therefrom onto a gas permeable conveyor 11, the interstices of the conveyor being sufficiently large to permit free flow of gas therethrough while preventing the discharge of the nodules through the upper run of the conveyor. The conveyor is preferably driven by any suitable means so that the upper run thereof moves continuously from the right to the left as viewed in Figure 1, and the material deposited thereon is thus carried toward and discharged into the kiln 12, a chute 13 receiving the material from the conveyor and directing the same into the kiln. It will be observed that the conveyor 11 is supported in a closed housing which, roughly speaking, is divided into upper and lower portions by the upper run of the conveyor and the chute 13, the lower portion 21 of the housing having an opening 22 therein through which gases are continuously removed by means of a fan 23. That part of the upper portion of the housing immediately above the upper run of the conveyor and the material thereon is divided into two zones or chambers 15 and 16 by means of a partition 14, the latter extending into close proximity to the material on the conveyor, the partition 14 being preferably so formed as to provide a passage 25 above the chamber 16, this passage communicating with a vent or stack 18 in which is disposed a damper 19. Extending through the passage 25 and communicating at one end with the atmosphere and at the other end with the chamber 16 are a plurality of conduits 27, and immediately beneath that part of the upper run of the conveyor 11 which defines the lower side of the chamber 16 are a plurality of stationary panels 28 with which are associated movable dampers 29, it being observed that fresh air may flow downwardly through the conduits 27 into the chamber 16 and through the layer of material therein, this flow being controlled by regulation of the dampers 29. It will also be noted that a portion of the hot kiln gases flows directly into the chamber 15 and downwardly through the material thereon, the remainder passing upwardly and flowing through the passage 25 and about the conduits 27 so as to heat the air passing downwardly therethrough, the gases thereafter being vented through the stack 18. By controlling the damper 19 the proportion of the hot gases flowing through the passage 25 may be controlled. A further control may be afforded by a vent or stack 31 in which is located a damper 30, and it will be noted that by concurrent regulation of the dampers 19 and 30, the amount of the hot gases employed to raise the temperature of the air flowing through the conduits 27 and into the chamber 16 may be varied without altering the amount of gas flowing into the chamber 15 and through the material in that zone.

It will be appreciated from the foregoing description that the passage 25 and the conduits 27 extending therethrough constitute a heat exchange device in which the heat of the kiln gases is employed to bring fresh air to the temperature required to be maintained in the chamber 16 and that this temperature can be varied as desired by regulation of the dampers 19 and 30 without affecting the operation of other parts of the apparatus. Regulation of the temperature in the chamber 16 and of the amount of air flowing through the material therein may be effected by means of the dampers 29. Consequently, it is possible by employment of this apparatus to accurately regulate the temperatures in the chambers 15 and 16 as well as the rate of flow therein. It will also be appreciated that any danger of concentration of undesirable compounds which may be volatilized in the kiln is avoided by the use of this construction.

Obviously any other efficient type of heat exchange device may be substituted for that shown in the drawing which is selected merely for the purpose of illustrating the invention. Again, if it is not desired to employ fresh air for use in the chamber 16, for example where some source of heated gas free from objectionable vapors is available, the conduits 27 may communicate with such source, the temperature of such gas being raised to that desired in the chamber 16 by the heat exchange device.

A modification of the construction shown in Figure 1 is illustrated in Figure 2 in which, in lieu of the employment of a stack or vent 18 to create a draft through the passage 25, the latter communicates with the lower portion 21 of the housing, so that the fan 23 may serve to draw all of the kiln gas through the apparatus and discharge the same through the opening 22.

Having thus described the invention, what is claimed as new and desired to be secured by Letters Patent is:

1. A process of treating raw material prior to the burning thereof in a kiln, which includes the steps of raising the temperature of a gas isolated from the waste gases of the kiln by heat derived from the latter, passing such gas through the material to elevate the temperature of the material, thereafter contacting the waste gases of the kiln with the material to further raise the temperature of the material, and finally discharging the material into the kiln.

2. A process of treating pulverulent material prior to the burning thereof in a kiln, which includes the steps of forming the material into moist nodules of generally uniform size, raising the temperature of a gas isolated from the waste gases of the kiln by heat derived from the latter, passing such gas through the nodulized material to completely dry the same, thereafter contacting the waste gases of the kiln with the dried nodules to partially burn the nodules, and delivering the partially burned nodules to the kiln.

3. A process of treating cement raw material prior to the burning thereof in a kiln, which includes the steps of forming the material into moist nodules, passing a heated gas other than the waste gases of the kiln through the nodules to completely dry and preheat the same, thereafter passing the waste kiln gases through the dry nodules to preburn and partially calcine the same, and delivering the partially calcined nodules to the kiln.

4. A process of treating cement raw material prior to the burning thereof in a kiln, which includes the steps of forming the material into moist nodules, raising the temperature of air by heat derived from the waste gases of the kiln and passing the heated air through the nodules to completely dry and preheat the same, thereafter passing the waste kiln gases through the dry nodules to preburn and partially calcine the same, and delivering the partially calcined nodules to the kiln.

5. A process of treating cement raw material prior to the burning thereof in a kiln, which includes the steps of forming the material into moist nodules, passing air at a temperature of the order of 500° to 800° F. through the nodules to completely dry and preheat the same, thereafter passing the waste kiln gases through the dry nodules to preburn and partially calcine the same, and delivering the partially calcined nodules to the kiln.

6. A process of manufacturing cement which consists in forming the raw material into small lumps or nodules having an appreciable moisture content, conveying the nodules toward the burning end of a kiln through two successive zones of different temperatures, drying the nodules in the first zone by passing through them a controlled amount of air heated by but out of contact with the gases of the kiln, said controlled amount being sufficient to subject the nodules to a slow drying in order to prevent the breaking up of the nodules by the rapid evaporation of their moisture, and preburning by the hot gases of the kiln the dried nodules in the second zone before their entry to the kiln.

7. In apparatus for preparing cement raw material or the like for introduction into a kiln, the combination with means for agglomerating the material to form small nodules having an appreciable moisture content, of a drying chamber, a preburning chamber, gas permeable means for supporting the agglomerated material within said chambers, means for causing a current of hot gas to flow through said supporting means and the material thereon within said preburning chamber to preburn the material, and means for causing cooler heated gases to flow through said supporting means and the material thereon within said drying chamber to dry the material prior to introduction of the material into the preburning chamber, said last named means including a heat exchange device through which said cooler gases are passed to raise the temperature thereof.

8. In apparatus for preparing cement raw material or the like for introduction into a kiln, the combination with means for agglomerating the material to form small nodules having an appreciable moisture content, of a drying chamber, a preburning chamber, gas permeable means for supporting the agglomerated material within said chambers, means for causing a current of hot gas to flow through said supporting means and the material thereon within said preburning chamber to preburn the material, means for causing cooler heated gases to flow through said supporting means and the material thereon within said drying chamber to dry the material prior to introduction of the material into the preburning chamber, said last named means including a heat exchange device through which said cooler gases are passed to raise the temperature thereof, and means directing a portion of the said hot gas into said heat exchange device, whereby the heat for raising the temperature of said cooler gases is derived from said hot gases.

9. In apparatus for preparing cement raw material for introduction into a kiln, the combination with means for agglomerating the material to form small nodules having an appreciable moisture content, of a chamber, a gas permeable conveyor arranged to receive said agglomerated material and to move the same in a layer through said chamber, means for separating said chamber into two zones, means for causing hot kiln gases to flow through the conveyor and the material thereon in that zone adjacent the discharge end of the conveyor to preburn the material, and means for causing cooler heated gases to contact with the material in that zone adjacent the receiving end of the conveyor to completely dry the agglomerated material prior to the preburning thereof, said last named means including a heat exchange device, and means for conveying a portion of said hot kiln gases through said heat exchange device to raise the temperature of said cooler heated gases therein.

10. In apparatus for preparing pulverulent material for introduction into a kiln, the combination with a conveyor, means for delivering the material in moist nodular form onto said conveyor, means for directing hot waste gases of the kiln through the material on the conveyor adjacent the discharge end of the latter, a heat exchange device deriving heat from the kiln gases, and means for causing air to flow through said device and through the material on the conveyor adjacent the receiving end of the latter.

11. In apparatus for preparing pulverulent material for introduction into a kiln, the combination with a conveyor, means for delivering the material in moist nodular form onto said conveyor, means for directing hot waste gases of the kiln through the material on the conveyor adjacent the discharge end of the latter, a heat exchange device deriving heat from the kiln gases, means for controlling the amount of kiln gases supplied to said device, and means for directing a flow of air through said device and through the material on said conveyor adjacent the receiving end of the latter, whereby the temperature of such air may be raised sufficiently to completely dry and preheat the nodular material prior to subjection thereof to the action of the waste kiln gases.

12. In apparatus for preparing pulverulent material for introduction into a kiln, the combination with a conveyor, means for delivering the material in moist nodular form onto said conveyor, means for directing hot waste gases of the kiln through the material on the conveyor adjacent the discharge end of the latter, a heat exchange device deriving heat from the kiln gases, means for controlling the amount of kiln gases supplied to said device, means for directing a flow of air through said device and through the material on said conveyor adjacent the receiving end of the latter, and means for controlling the rate of flow of such air, whereby the temperature of such air may be raised sufficiently to completely dry and preheat the nodular material prior to subjection thereof to the action of the waste kiln gases.

13. In apparatus for preparing pulverulent material for introduction into a kiln, the combination with a conveyor, means for delivering the material in moist nodular form onto said conveyor, means for directing hot waste gases of the kiln through the material on the conveyor adjacent the discharge end of the latter, a heat exchange device deriving heat from the kiln gases, and means for causing air to flow through said device and through the material on the conveyor adjacent the receiving end of the latter, said means for directing the waste kiln gases and causing the said flow of air including a blower common to both.

HANS BUSSMEYER.